(12) United States Patent
Hassan et al.

(10) Patent No.: US 10,447,338 B2
(45) Date of Patent: Oct. 15, 2019

(54) ORTHOGONAL SPREADING SEQUENCE CREATION USING RADIO FREQUENCY PARAMETERS

(71) Applicant: Microsoft Technology Licensing, LLC, Redmond, WA (US)

(72) Inventors: Amer A. Hassan, Kirkland, WA (US); Edward C. Giaimo, III, Bellevue, WA (US); Paul Mitchell, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/012,061

(22) Filed: Jun. 19, 2018

(65) Prior Publication Data
US 2018/0309476 A1 Oct. 25, 2018

Related U.S. Application Data

(63) Continuation-in-part of application No. 15/275,176, filed on Sep. 23, 2016, now Pat. No. 10,020,838.

(51) Int. Cl.
*H04B 1/707* (2011.01)
*H04B 1/7073* (2011.01)
(Continued)

(52) U.S. Cl.
CPC ......... *H04B 1/7073* (2013.01); *H04B 1/7143* (2013.01); *H04B 17/318* (2015.01);
(Continued)

(58) Field of Classification Search
CPC .. H04B 1/707; H04B 1/70718; H04B 1/7073; H04B 1/70735; H04B 1/7075;
(Continued)

(56) References Cited

U.S. PATENT DOCUMENTS 5,120,997 A * 6/1992 Cantwell ................ H04K 3/228
327/50
5,627,863 A * 5/1997 Aslanis ............... H04L 27/2662
370/509
(Continued)

FOREIGN PATENT DOCUMENTS

| EP | 2178231 A1 | 4/2010 |
| WO | 9623376 A2 | 8/1996 |
| WO | 2015144256 A1 | 10/2015 |

OTHER PUBLICATIONS

"Non-Final Office Action Issued in U.S. Appl. No. 15/275,176", dated Mar. 31, 2017, 12 Pages.
(Continued)

*Primary Examiner* — Siu M Lee
(74) *Attorney, Agent, or Firm* — Schwegman Lundberg & Woessner, P.A.

(57) ABSTRACT

A spreading sequence generator for a first radio frequency (RF) transceiver receives an RF signal from a second RF transceiver. The first RF transceiver measures power levels of the received RF signal at a plurality of instants to generate respective digital power level values and uses the plurality of digital power level values to create a first spreading sequence. The second RF transceiver receives an RF signal from the first RF transceiver and performs the same functions to create a second spreading sequence. Due to the reciprocal nature of the RF channel between the first and second RF transceivers, the first and second cryptographic keys match.

20 Claims, 8 Drawing Sheets

(51) Int. Cl.
*H04J 13/12* (2011.01)
*H04J 13/00* (2011.01)
*H04B 1/7143* (2011.01)
*H04B 17/318* (2015.01)
*H04W 52/24* (2009.01)
*H04B 1/69* (2011.01)

(52) U.S. Cl.
CPC .......... *H04J 13/0022* (2013.01); *H04J 13/12* (2013.01); *H04W 52/245* (2013.01); *H04B 2001/6904* (2013.01); *H04B 2001/6908* (2013.01)

(58) Field of Classification Search
CPC ............ H04B 1/70751; H04B 1/70752; H04B 1/70753; H04B 1/70754; H04B 1/70757
USPC ....... 375/140, 142, 143, 145, 147, 149, 150, 375/152, 316
See application file for complete search history.

(56) References Cited

U.S. PATENT DOCUMENTS

| | | | |
|---|---|---|---|
| 5,852,630 A * | 12/1998 | Langberg ............ | H04L 27/2647 375/219 |
| 5,910,948 A | 6/1999 | Shou et al. | |
| 5,995,533 A | 11/1999 | Hassan et al. | |
| 6,128,288 A * | 10/2000 | Miya ...................... | H04B 1/707 370/335 |
| 6,560,271 B1 | 5/2003 | Han | |
| 7,873,097 B1 | 1/2011 | Luecke et al. | |
| 7,921,282 B1 | 4/2011 | Mukerji et al. | |
| 8,300,675 B2 | 10/2012 | Kerr et al. | |
| 8,643,475 B1 | 2/2014 | Kohno et al. | |
| 10,020,838 B2 | 7/2018 | Hassan et al. | |
| 2002/0172180 A1 | 11/2002 | Hall et al. | |
| 2005/0281318 A1 * | 12/2005 | Neugebauer ........... | H04B 1/707 375/134 |
| 2009/0015385 A1 | 1/2009 | Teuwen et al. | |
| 2011/0249704 A1 | 10/2011 | Shimomura et al. | |
| 2012/0128157 A1 | 5/2012 | Braun | |
| 2013/0077789 A1 | 3/2013 | Tahan et al. | |
| 2013/0114643 A1 | 5/2013 | Shope et al. | |
| 2015/0089588 A1 | 3/2015 | Du et al. | |
| 2016/0302074 A1 | 10/2016 | Hekstra et al. | |
| 2019/0013888 A1 * | 1/2019 | Li ............................ | H03L 7/08 |

OTHER PUBLICATIONS

"Non-Final Office Action Issued in U.S. Appl. No. 15/275,176", dated Oct. 5, 2017, 14 Pages.

"Notice of Allowance Issued in U.S. Appl. No. 15/275,176", dated Mar. 16, 2018, 9 Pages.

Barker, et al., "Recommendation for Cryptographic Key Generation", In Special Publication of National Institute of standards and Technology, Dec. 2012, 26 Pages.

Chae, et al., "Maximalist Cryptography and Computation on the WISP UHF RFID Tag", In Wirelessly Powered Sensor Networks and Computational, Feb. 21, 2013, 12 Pages.

Maes, et al., "PUFKY: A Fully Functional PUF-based Cryptographic Key Generator", In Proceedings of the 14th International Conference on Cryptographic Hardware and Embedded Systems, Sep. 9, 2012, 18 Pages.

"International Search Report and Written Opinion Issued in PCT Application No. PCT/US2017/051681", dated Dec. 1, 2017, 11 Pages.

"Non Final Office Action Issued in U.S. Appl. No. 16/004,282", dated Feb. 5, 2019, 21 Pages.

"Final Office Action Issued in U.S. Appl. No. 16/004,282", dated Jun. 5, 2019, 7 pages.

* cited by examiner

US 10,447,338 B2

ORTHOGONAL SPREADING SEQUENCE CREATION USING RADIO FREQUENCY PARAMETERS

CROSS-REFERENCE TO RELATED APPLICATION

This application is a continuation-in-part application of U.S. application Ser. No. 15/275,176, filed on Sep. 23, 2016, the disclosure of which is expressly incorporated herein by reference in its entirety.

BACKGROUND

Radio-frequency telecommunication systems currently use various types of spread spectrum and spreading technology for transmitting and receiving data. Commonly used forms of spreading technology include frequency-hopping spread spectrum (FHSS), direct-sequence spread spectrum (DSSS), orthogonal frequency division multiplexed (OFDM) spread spectrum, and time-hopping spreading (THS).

Each of these techniques uses a spreading sequence to spread the transmitted signal across an allocated bandwidth or to transmit the signal in an allocated bandwidth at times determined by the spreading sequence. The spreading sequence used by an FHSS system may describe successive frequency bands to be used during successive predetermined intervals. The spreading sequence used by a DSSS system may be a spreading sequence that spreads the signal over a frequency band spanning the frequency components of the spreading sequence. The spreading sequence used by an OFDM system may select subcarriers from a set of mutually orthogonal subcarriers. The spreading sequence for a THS system may be a sequence of time intervals when the signal may be transmitted.

SUMMARY

This summary is not an extensive overview of the claimed subject matter. It is intended to neither identify key elements of the claimed subject matter nor delineate the scope of the claimed subject matter. Its sole purpose is to present some concepts of the claimed subject matter in a simplified form as a prelude to the more detailed description that is presented later.

According to one aspect, first RF transceiver receives a first RF signal from a second RF transceiver, synchronized to the first RF transceiver, via one or more RF channels. The first RF transceiver generates a sequence of power levels representing the power of the received RF signal at a plurality of instants. The first RF transceiver creates a spreading sequence from the digitized samples and uses the spreading sequence to spread data for transmission to the second RF transceiver.

According to another aspect, the first RF transceiver receives a plurality of first RF signals from the second RF transceiver and transmits a plurality of second RF signal to the second RF transceiver via the one or more channels. The first RF transceiver is configured to interleave the transmission of the plurality of first RF signals with reception of the second RF signals.

The following description and the annexed drawings set forth in detail certain illustrative aspects of the claimed subject matter. These aspects are indicative, however, of a few of the various ways in which the principles of the claimed subject matter may be employed and the claimed subject matter is intended to include all such aspects and their equivalents. Other advantages and novel features of the claimed subject matter will become apparent from the following detailed description when considered in conjunction with the drawings.

DETAILED DESCRIPTION

Figure 1A:
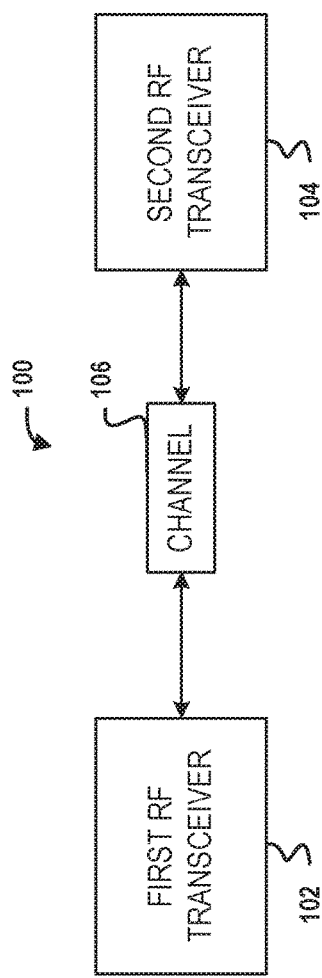
FIGS. 1A and 1B are block diagrams of example networks.

The disclosed embodiments describe methods by which two RF transceivers configured to communicate over a common channel or set of channels can independently create matching spreading sequences to determine frequency bands and/or timing and/or a spreading code used for frequency or time spreading data exchanged by the two RF transceivers. The embodiments exchange little or no information about the spreading sequences. These embodiments provide a technical advantage in that two RF transceivers may create matching spreading sequences, and use the sequences to spread and despread data for communications on a channel between the two RF transceivers without coordinating on the use of a particular spreading sequence by both devices. The example embodiments provide another advantage in that the determined spreading sequences may be determined just prior to a transmission and, thus, may be configured to be orthogonal or mostly orthogonal with existing traffic in the channel(s).

The RF channel(s) between two transceivers is/are reciprocal; RF signals sent from the first transceiver to the second transceiver and from the second transceiver to the first transceiver experience essentially the same channel characteristics. Thus, the power level of the signals received via the channel(s) are similar and exhibit similar variations due to environmental conditions and due to the presence of other communication sessions Thus, when similar equipment is used on both sides of the RF channel, each RF transceiver receives similar signals from the other RF transceiver, during the predetermined interval, at similar power levels. The power levels received at a plurality of instants may be captured and converted into a spreading sequence used to generate a spread-spectrum transmission by both RF transceivers. As described below, the spreading sequence may be created directly from the successive power levels, for example, by concatenating the power level values, or may be created indirectly, for example, by applying the concatenated power level values to an error correction code (ECC) decoder or to a pseudorandom number (PN) generator. The ECC decoder perform a many-to-one mapping so that slight variations between the power levels sensed by two communicating RF transceivers may be mapped to a common spreading sequence. The embodiments described below utilize different spreading sequences depending on whether the RF transceiver is used in an FHSS, DSSS. THS or OFDM spread spectrum system.

Because the power level sensed during the predetermined intervals depend on the characteristics of the two RF transceivers and the RF channel(s) as experienced by the two transceivers, the power levels of the signals received by the two transceivers during a given interval exhibit similar variations. Thus, similar spreading sequences will be created by the two devices from the sensed power levels. Because the spreading sequences are created based on the current characteristics of the respective transceivers and RF channel(s) spreading sequences created at different times may be subject to different characteristics (e.g., thermal effects) so that each new spreading sequence is likely to be different from the previously created spreading sequence.

The created spreading sequences may be used to send and receive spread-spectrum signals between the two devices. In some embodiments, each transceiver may independently create the spreading sequence and then use the spreading sequence to transmit and receive a known data set at times determined by a predetermined protocol. The predetermined protocol may also determine other parameters for generating the spreading sequence, such as target transmit power levels used by the devices. The power levels may be determined, for example, based on the relative locations of the two RF transceivers, as determined, for example, using respective global navigation satellite system (GNSS) receivers. When one RF transceiver cannot receive the known data set using the spreading sequence, the RF transceiver may determine that the two spreading sequences do not match and restart the process to create a new spreading sequence. This process continues until both transceivers have created the same spreading sequence.

As a preliminary matter, some of the figures describe concepts in the context of one or more structural components, variously referred to as functionality, modules, features, elements, or the like. The various components shown in the figures can be implemented in any manner, such as software, hardware, firmware, or combinations thereof. In some cases, various components shown in the figures may reflect the use of corresponding components in an actual implementation. In other cases, any single component illustrated in the figures may be implemented by a number of actual components. The depiction of any two or more separate components in the figures may reflect different functions performed by a single actual component.

Other figures describe the concepts in flowchart form. In this form, certain operations are described as constituting distinct blocks performed in a certain order. Such implementations are examples and non-limiting. Certain blocks described herein can be grouped together and performed in a single operation, certain blocks can be broken apart into multiple component blocks, and certain blocks can be performed in an order that differs from that which is illustrated herein, including a parallel manner of performing the blocks. The blocks shown in the flowcharts can be implemented by software, hardware, firmware, manual processing, or the like. As used herein, hardware may include microprocessors, digital signal processors (DSPs), microcontrollers, computer systems, discrete logic components, and/or custom logic components such as field programmable gate arrays (FPGAs), application specific integrated circuits (ASICs), programmable logic arrays (PLAs) or the like.

As to terminology, the phrase "configured to" encompasses any way that any kind of functionality can be constructed to perform an identified operation. The functionality can be configured to perform an operation using, for example, software, hardware, firmware, or the like. For example, the phrase "configured to" can refer to a logic circuit structure of a hardware element that is arranged to implement the associated functionality. The phrase "configured to" can also refer to a logic circuit structure of a hardware element that is arranged to implement the coding design of associated functionality of firmware or software. The term "module" refers to a structural element that can be implemented using any suitable hardware (e.g., a processor, among others), software (e.g., an application, among others), firmware, and/or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system which may include a single-core or multi-core microprocessor, a microcontroller and/or a digital signal processor (DSP).

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any non-transitory computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media. i.e., not storage media, may additionally include communication media such as transmission media for wireless signals and the like.

Figure 1B:
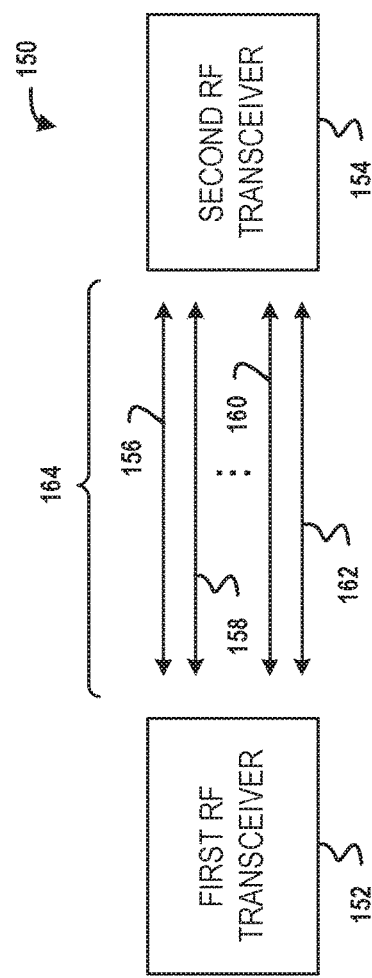

FIG. 1A is a block diagram of a simple RF communication network 100 in which two RF transceivers, 102 and 104 communicate via a single channel 106. The channel may be a wideband RF channel or a narrow band channel and may be used for DSSS communication or THS communication. FIG. 1B is block diagram showing another RF communication network 150. In this network two RF transceivers 152 and 154 communicate through a channel 164 that includes multiple frequency channels 156, 158, 160 and 162. This network may be used, for example, in FHSS and OFDM spread spectrum. In one embodiment, the transceivers 102 and 152 may be stations (STAs) in the same or different Wi-Fi networks and the transceivers 104 and 154 may be Wi-Fi access points. In other embodiments, the transceivers 102 and 152 may be user equipment (UE) devices in a wireless communication network and the RF transceivers 104 and 154 may be base stations such as enhanced Node Bs (eNBs) such as a serving cell, a microcell, a picocell or a femtocell.

Figure 2:
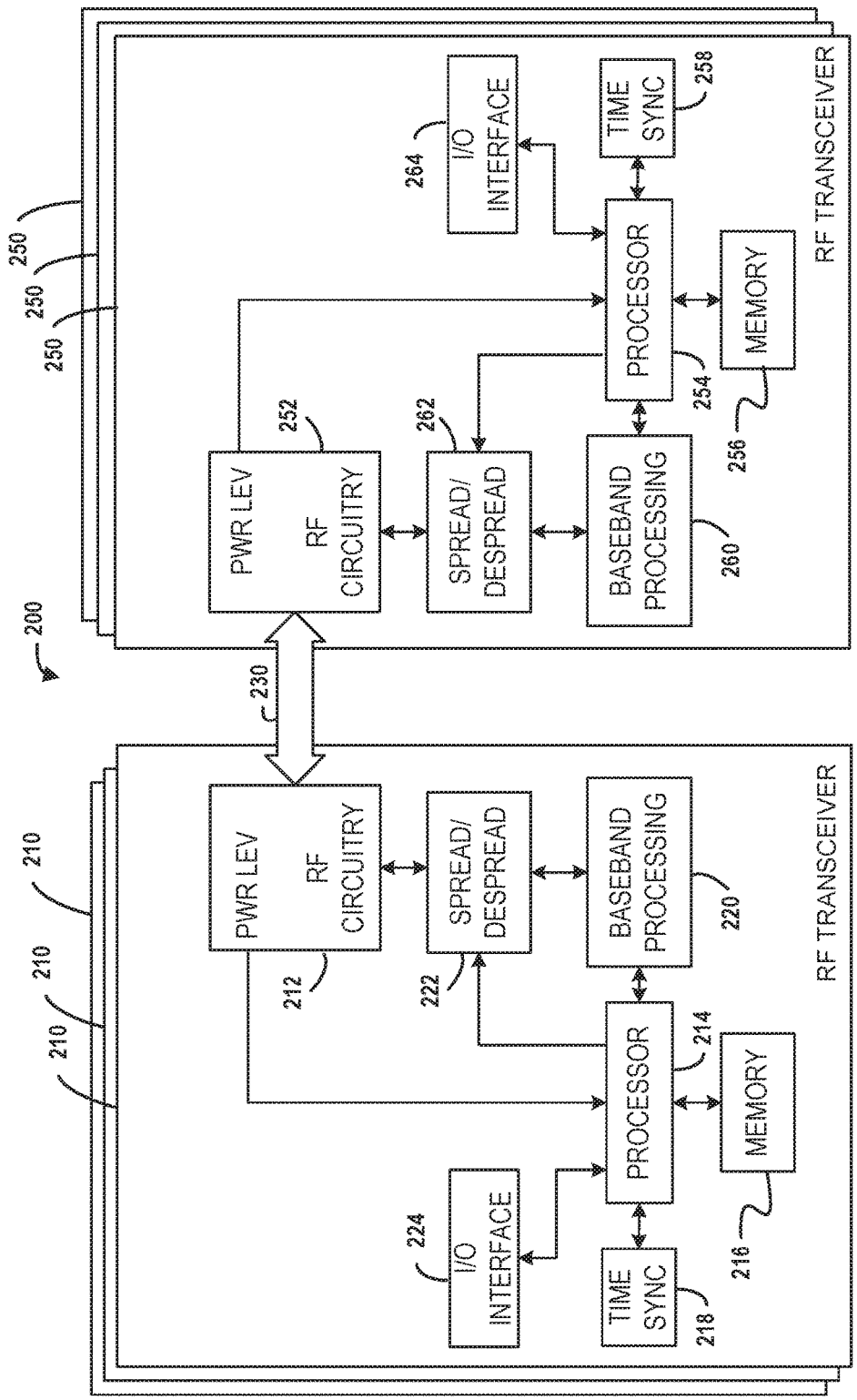
FIG. 2 is a block diagram of a network showing details of two example RF transceivers

FIG. 2 is a block diagram showing details of a system 200 that includes two or more RF transceiver pairs 210 and 250 coupled by one or more RF channels 230. As shown, the system 200 may employ multiple transceivers 210 and 250 on each side of the RF channel(s) 230. For example, the multiple transceivers 210 may implement a FHSS network, THS network, a DSSS network (e.g., a code division multiple access (CDMA) network) or an orthogonal frequency division multiple access (OFDMA) network. The multiple transceivers 250 may communicate with the transceivers 210 over the RF channel(s) 230. The RF channel(s) 230 may be over-the-air channels or wired channel(s). RF transceiver 210, for example, includes RF circuitry 212, a memory 216, time synchronization circuitry 218 (e.g., a global navigation satellite system (GNSS) receiver), baseband processing circuitry 220, spreading/despreading circuitry 222 and an input/output (I/O) interface 224. The RF circuitry 212 may include one or more antennas (not shown) and/or RF couplers (not shown), one or more RF amplifiers (not shown), an automatic gain control circuit (AGC) (not shown), a receiver (not shown), and a transmitter (not shown). The RF circuitry may also include circuitry to generate a digital power level signal, PWR LEV, such as received signal strength indication (RSSI) and/or received channel power indication (RCPI), from a control signal of the AGC. The AGC monitors the received signal and generates a control signal that adjusts the gain applied by the RF amplifier(s) to normalize the output signal amplitude. Thus, the PWR LVL signal is inversely proportional to the AGC control signal in that the larger the AGC signal the smaller the power level of the signal received at the RF receiver and vice versa. As an alternative to generating the power level signal in the RF circuitry, the processor may employ a wireless network monitoring tool, such as Wireshark®, Kismet® or Inssider® to generate the PWR LVL signal. The example power level measurements include RSSI, which may be generated from the preamble of a received packet signal and RCPI which may be generated from the entire packet. While some embodiments use packet-based transmissions, it is contemplated that other methods may be used to measure the power level of a received circuit, for example, monitoring the reference signal of an OFDM transmission, or monitoring a power level of an unmodulated carrier transmitted in a predetermined interval by each of the RF transceivers. It is also contemplated that multiple power measurements may be combined to generate a single power level value, for example averaging RSSI and RCPI.

When RF transceiver 210 is receiving signals from the RF transceiver 250, the RF circuitry 212 provides a received signal to spreading/despreading circuitry 222 which despreads the signal according to a spreading sequence and demodulates the despread signal. Examples of the spreading/despreading circuitry 222 are described below with reference to FIGS. 3A-3D. RF circuitry 212 also provides a measured power level signal, PWR LEV, such as RSSI or RCPI, to the processor 214. The processor 214 uses the power level measurements to create the spreading sequence prior to receiving any data signals. The process of creating the spreading sequence is described below with reference to FIGS. 4A-5B.

The processor 214 is coupled to the memory 216 which holds program instructions and data structures used by the processor 214 to implement the processing described herein. The memory 216 may include, without limitation, random access memory (RAM) read-only memory (ROM) and/or electronically alterable memory such as flash memory. The example processor 214 shown in FIG. 2 may also be coupled to the time synchronization circuitry 218 and may use a time signal provided by the a GNSS receiver to synchronize its processing with the other RF transceivers 210 and 250. As an alternative to using the GNSS receiver, the RF transceiver may use a radio for another time service, such as the WWV or WWVB services offered by the National Institute of Standards and Technology (NIST). In this instance, the time synchronization circuitry 218 may be replaced by a radio receiver tuned to the WWV or WWVB broadcast frequency. In another alternative, the RF transceivers 210 and 250 may employ a time synchronization protocol such as the network time protocol (NTP) or precision time protocol (PTP) as the time synchronization circuitry 218 to maintain clock synchronization.

The spreading/despreading circuitry 222 provides the despread and demodulated signal to baseband processing circuitry 220 which may generate digital data packets from the demodulated signal. In some embodiments, the baseband processing circuitry may provide a power level signal to the processor 214. In these embodiments, the RF circuitry 212 may provide, to the processor 214, data indicating an amount of gain or attenuation applied to the received RF signal by the circuitry 212. In these embodiments, the processor 214 may calculate the power level of the signal received at the receiver by adjusting the power level signal received from the baseband processing circuitry to compensate for the gain or attenuation applied by the RF circuitry 212. The processor 214 may provide the data packets and/or data extracted from the data packets to other circuitry (not shown) external to the RF transceiver 210.

When the RF transceiver 210 transmits data, the processor 214 may receive the data to be transmitted from the I/O interface 224. The processor 214 then provides the spreading sequence to be used to the spreading/despreading circuitry 222 and provides the data (e.g., data packets) to be transmitted to the baseband processing circuitry 220. The baseband processing circuitry 220 converts the data into a baseband signal that is applied to the spreading/despreading circuitry 222. The circuitry 222 modulates and spreads the signal to generate the RF signal to be transmitted by the RF circuitry 212 to the RF transceiver 250 via the channel(s) 230.

The example transceiver 250 includes components similar to the transceiver 210 and performs the same functions. For the sake of brevity, the functions performed by the transceiver 250 to receive and transmit data are not described in detail as they mirror the functions performed by the RF transceiver 210, described above. The example transceiver 250 includes RF circuitry 252, a processor 254, a memory 256, time synchronization circuitry 258, baseband processing circuitry 260, spreading/despreading circuitry 262 and an input/output (I/O) interface 264. As with the RF circuitry 212, the RF circuitry 252 may include one or more antennas (not shown) and/or RF couplers (not shown), a receiver (not shown), and a transmitter, (not shown). The RF circuitry 252 may also include a wireless network monitoring tool to measure a digital power level signal, PWR LEV, such as a received signal strength indication (RSSI) or received channel power indicator (RCPI).

As described below, the RF transceivers 210 and 250 may be any such RF transceiver as long as they have similar characteristics. Indeed, it may be advantageous to use relatively low-quality devices, at least for spreading sequence creation, as these devices tend to exhibit greater variability in their steady-state operations than higher-quality devices. This greater variability may result in successively created sequences having greater differences, and, thus, may enhance the ability of the RF transceivers 210 and 250 to identify a suitable spreading sequence since, as described below, it may be desirable to create multiple spreading sequences to find a sequence that is at least mostly orthogonal with spreading sequences used by the other RF transceiver pairs 210 and 250.

FIGS. 3A-3D describe different spreading/despreading circuitry 222 that may be used with the different signal spreading methods such as FHSS, DSSS, THS and OFDM spread spectrum, respectively. The spreading/despreading circuits are described with reference to the spreading/despreading circuitry 222 and processor 214 of RF transceiver 210. The descriptions also apply to the spreading/despreading circuitry 262 and processor 254 of RF transceiver 250. When one of the spreading/despreading circuits 222A, 222B, 222C, or 222D is implemented in RF transceiver 210, the same type of spreading/despreading circuit is implemented in RF transceiver 250.

Figure 3A:
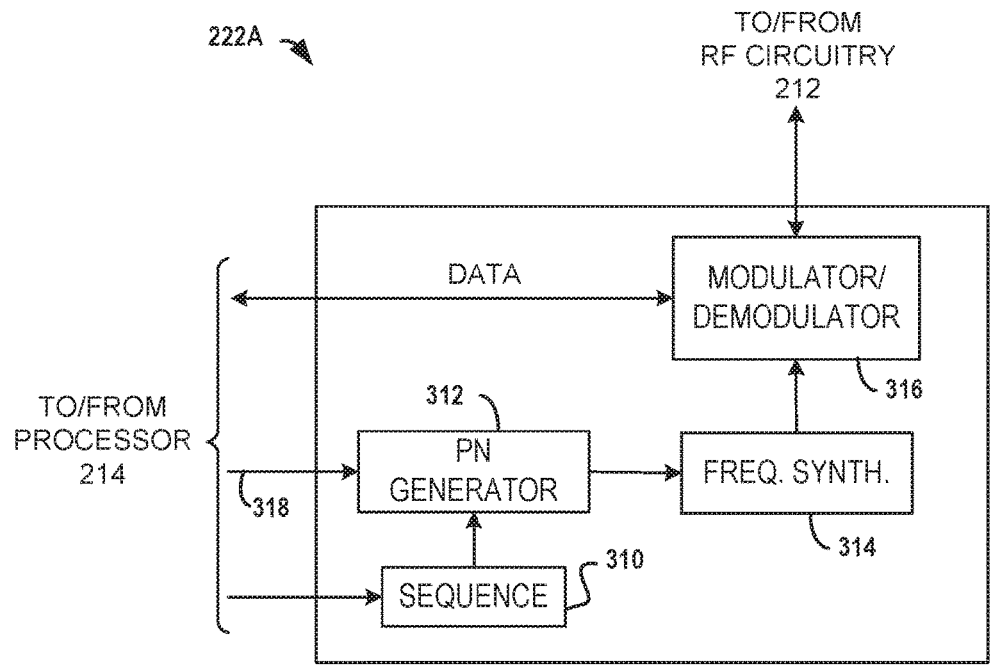
FIGS. 3A, 3B, 3C and 3D are block diagrams of example signal spreading/despreading circuits for use in the RF transceivers shown in FIG. 2.

FIG. 3A is a block diagram of an example spreading/despreading circuit 222A that may be used in a FHSS system. The example circuit 222A receives a spreading sequence from the processor 214 and stores the spreading sequence in a register 310. The spreading sequence in this example may be a seed value that is loaded into a pseudo-random number (PN) generator 312. The example PN generator 312 is implemented in software running on the processor 212. Alternatively, the PN generator may be implemented in hardware, for example, as a reentrant linear-feedback shift register (not shown). The spreading sequence is loaded, as a seed value, into the PN generator 312 which receives a shift signal 318 from the processor 214. Responsive to the shift signal, the PN generator 312 provides a PN value to a frequency synthesizer 314 which uses the value to set the carrier frequency of a modulator/demodulator 316 to the next hop frequency. The values provided by the PN generator map into the frequency bands available for use in the frequency hopping system.

The modulator/demodulator circuit 316 then modulates the data at the selected hop frequency and applies the modulated signal to the RF circuitry 212 for transmission to the RF transceiver 250. Because the RF transceivers 210 and 250 are synchronized, use the same spreading/despreading circuitry 222A, and use the same spreading sequence, the RF transceiver can despread and demodulate the data signal by applying the spreading sequence to the corresponding PN generator and applying the corresponding frequency-synthesized carrier signals to the demodulator used by the RF transceiver 250.

Figure 3B:
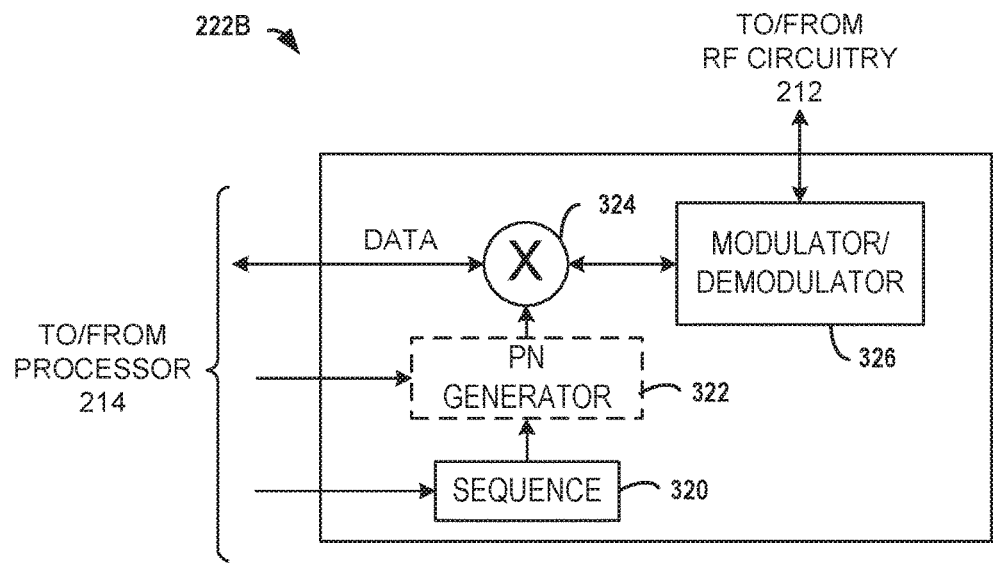

FIG. 3B is an example spreading/despreading circuit 222B that may be used in a DSSS system. In circuit 222B, the processor 214 creates a spreading sequence that is stored in spreading sequence register 320 and is used to multiply the input data stream provided by the processor 214 in the multiplier 324. The spreading sequence used in this embodiment, also referred to as a chip code, may be a binary string that has a length which depends on the bandwidth of the RF channel 230. The multiplier 324 multiplies each bit of the data provided by the processor 214 by several bits of the spreading sequence to produce a data stream having a higher bandwidth than the bandwidth of the data signal provided by the processor 214. This multiplication spreads the data signal over the bandwidth of the RF channel 230.

The signal generated by the multiplier 324 is applied to the modulator/demodulator 326 which modulates a carrier to produce a signal for transmission to the RF transceiver 250. Optionally, some embodiments may apply the spreading sequence stored in the register 320 as a seed value to a PN generator 322, which may be a reentrant linear feedback shift register similar to the PN generator 312 described above with reference to FIG. 3A. The spreading sequence may be created by the PN generator 322 responsive to shift signals provided by the processor 214. The use of the PN generator 322 may be desirable where multiple pairs of transceivers 210 and 250 communicate through the same channels. Since the transceiver pairs 210 and 250 generate their spreading sequences at different times, it is likely that the spreading codes will be different. As described below, however, because multiple pairs of transceivers 210 and 250 use the same channel, each transceiver pair 210 and 250 may create the same or similar spreading sequences. The PN generator may allow the transceivers 210 and 250 to produce different spreading sequences for the same seed value based on different shift values from processor 214. Thus, where multiple transceiver pairs 210 and 250 may concurrently communicate, the spreading sequence for each transceiver pair 210 and 250 may be determined by the PN generator using the spreading sequence from register 320 as a seed value and using a predetermined number of shifts of the PN generator for that transceiver pair 210 and 250.

The RF transceiver 250 may receive, demodulate and despread the signal using the same spreading/despreading circuitry 222B by reversing the operations described above. Because the transceivers 210 and 250 are synchronized and use the spreading/despreading hardware 222B, the transceiver 250 generates the same spreading code and uses it to recovers the data sent by the transceiver 210 from the DSSS signal.

Figure 3C:
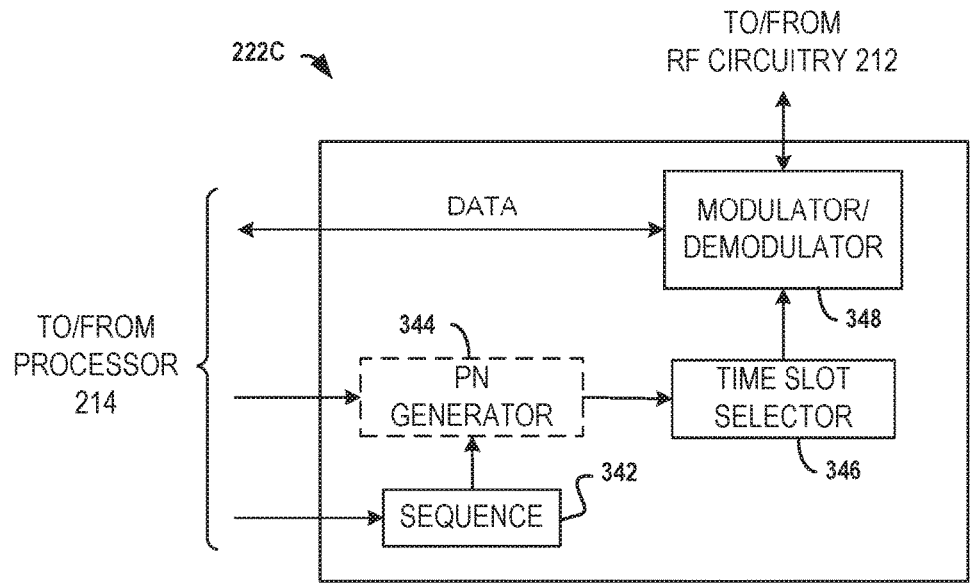

FIG. 3C shows spreading/despreading circuitry 222C suitable for use with a THS system. THS systems employ a number of time slots and select time slots as indicated by the spreading sequence for one of the RF transceivers 210 or 250 to transmit data to the other transceiver 250 or 210, respectively. Multiple transceiver pairs 210 and 250 may exchange data as long as there is little or no overlap among the slots selected by each pair. The spreading sequence created by the processor 214 in a THS system may be a binary string in which logic-one values map to time slots in which data may be transmitted and logic-zero values map to time slots in which data may not be transmitted. As shown in FIG. 3C, the spreading sequence created by the processor 214 is stored in a spreading sequence register 342. The spreading/despreading circuitry 222C may include an optional PN generator 344 that is similar to the PN generator 312 described above with reference to FIG. 3A.

The spreading sequence stored in the register 310 may directly control the time slot selector 346 or, optionally, may be applied to the PN generator 344 as a seed value such that the processor 214 periodically changes the spreading sequence among a set of known spreading sequences provided by the PN generator 344. The use of the PN generator may be desirable as described above when multiple pairs of transceivers communicate through the same channels. The RF transceiver 250 receives the transmitted data using the same spreading sequence due to the spreading sequence creation, described below and the synchronization of the RF transceivers 210 and 250.

The spreading sequence applied to the time slot selector 346 selects time slots in which data from the processor 214 is to be transmitted to the RF transceiver 250. When the value of the spreading sequence applied to the time slot selector 346 indicates a selected time slot, the modulator/demodulator 348 modulates a carrier signal with the data to be transmitted and provides the modulated carrier signal to the RF circuitry 212.

In response to the spreading sequence, the time slot selector 346 selects a time slot in which to send the next data packet and causes the modulator/demodulator 348 to modulate the carrier signal with the data packet during the selected time slot and applies the resulting modulated signal to the RF circuitry 212 for transmission to the RF transceiver 250. The transceiver 250 uses the same spreading sequence as the transceiver 210 to receive the THS signal. The operation of the transceiver 250 reverses the functions of the transceiver 210 described above to recover the data transmitted by the transceiver 210 using THS.

Figure 3D:
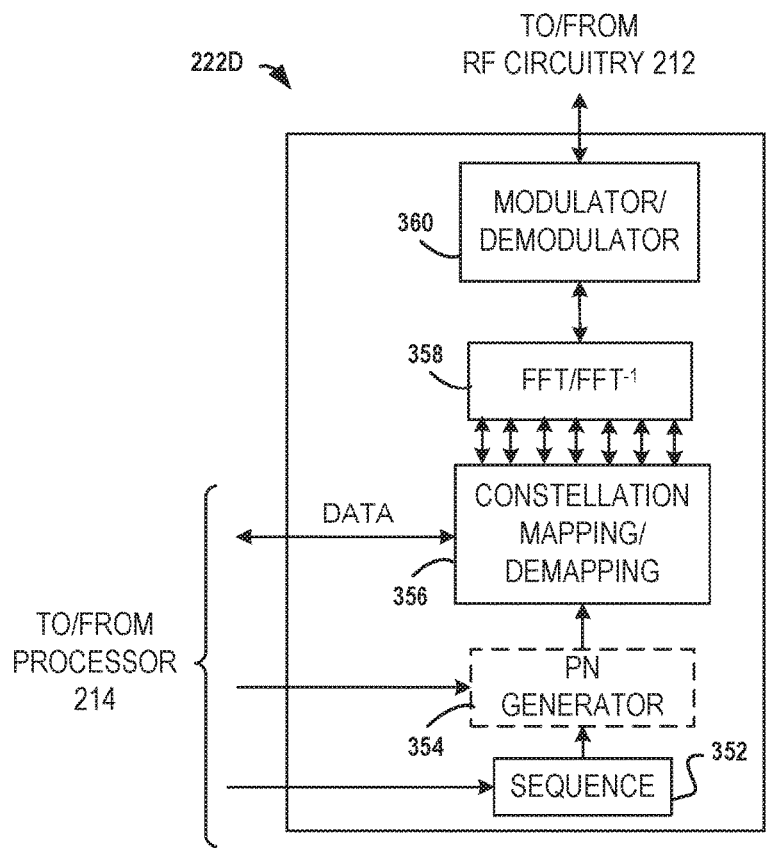

FIG. 3D is a block diagram of a spreading/despreading circuit 222D suitable for use in an OFDM spread spectrum transceiver. An OFDM transceiver may be used, for example, in an orthogonal frequency division multiple access (OFDMA) environment in which a one or more RF transceivers (e.g., an AP) may communicate with one or more other transceivers (e.g., STAs). OFDM channels may employ one or more carriers, each carrier having multiple subcarriers. Data sent through OFDMA channels may also be divided into multiple time slots. An OFDMA transmitter may send data to different OFDMA receivers based on selected subcarriers in the frequency domain and time slots in the time domain. The spreading sequence used by the spreading/despreading circuit 222D, thus, may identify both a set of subcarriers and a set of time slots that may be used by the transceiver. In some embodiments, the spreading sequence may consist of a spreading sequence of symbols, including both zero-valued and non-zero-valued symbols, where the zero-valued symbols indicate time slots in which the transceiver may not transmit data and the non-zero-valued symbols represent respective sets of subcarriers that the transceiver may use during time slots in which it may transmit data.

The spreading/despreading circuit 222D of the RF transceiver 210 stores the spreading sequence received from the processor 214 in a register 352. Optionally, the spreading sequence may then be applied to a PN generator 354 that receives a shift signal from the processor 214. The PN generator 354 may be used for the reasons described above in an environment including multiple APs and/or multiple STAs to ensure that the spreading sequences are mutually orthogonal or at least mostly mutually orthogonal. The spreading sequence provided by the register 352 or PN generator 354 is applied to a constellation mapping/demapping circuit 356. The circuit 356 selects which time slots to use and, in those time slots, which subcarriers to use. As described above, only time slots corresponding to non-zero-valued symbols are used to transmit data and, in those time slots, the value of the symbol maps to a particular set of subcarriers (e.g., a constellation). Depending on the modulation scheme, each subcarrier may be used to transmit one or more data bits. The constellation mapping/demapping circuit 356 maps the data provided by the processor 214 into the time slots and subcarriers according to the spreading sequence. The mapped data values are then applied to an inverse fast Fourier transform ($FFT^{-1}$) operation to generate a baseband signal. The baseband signal is applied to the modulator/demodulator to produce an RF signal to be applied to the RF circuitry 212 for transmission to the RF transceiver 250. The RF transceiver 250 receives, demodulates, and despreads the signal using the circuitry 222C based on the same spreading sequence by reversing the functions described above, using a fast Fourier transform (FFT) operation to retrieve the data values from the modulated subcarriers as determined by the spreading sequence.

Some embodiments create the sequence by monitoring the power level, and in particular, the RSSI and/or RCPI of a received signal. Each RF transceiver 210 and 250 may, for example, transmit a sequence of null packets to the other RF transceiver 250 and 210 during an initial interval, before transmitting data. Each null packet may correspond to an instant at which the other RF transceiver measures a power level. Each transceiver creates a sequence of symbols representing the received power levels of the packets. These power levels may fluctuate due to variations in the RF channel 230. The power levels resulting from these variations are sampled and processed, as described below, to generate the successive symbols. Due to the reciprocal nature of the channel 230, the null packets exhibit similar power level variations, allowing the two RF transceivers to create similar spreading sequences. In some embodiments, RF transceiver 210 transmits a set of null packets which are received and processed by RF transceiver 250 to generate the spreading sequence and then RF transceiver 250 transmits a set of null packets which are received and processed by RF transceiver 210. In other embodiments, the transceivers 210 and 250 may alternate sending null packets. This second method may be preferable as it is more likely that the successive packets will be subject to the same channel characteristics and, thus, will produce the same symbols.

In some networks, however, the power level signal received by one RF transceiver may 210 or 250 have one or more symbol differences compared to the power level signal received by the other RF transceiver 250 or 210. Thus, spreading sequences created by the two RF transceivers directly from the successive power level values may not be identical. The power level signals, for example, may exhibit low-level variations due to thermal noise or an intermittent interferer. In some embodiments, the power level values may be further processed to generate symbols including only selected bits of the values. Furthermore, zero-valued symbols may be ignored, depending on the type of spreading sequence that is being created.

Example systems may also convert non-identical spreading sequences having a relatively small number of differences into identical spreading sequences by applying sets of symbols derived from the received power level measurements to an ECC decoder, such as a Reed-Solomon decoder. In these embodiments, the decoder may implement a many-to-one mapping algorithm by which multiple sets of symbols map into a common spreading sequence. Thus, sets of symbols generated from two sets of values representing the respective power levels of packets received by different RF transceivers and having a relatively small number of different values may map into a common spreading sequence. The number of symbol differences that can be mapped into the same value depends on the Hamming distance of the particular ECC. In some embodiments, the spreading sequences output by the ECC decoder of may be mutually orthogonal spreading sequences (e.g. a set of Walsh codes). In these embodiments, the ECC decoder of a first RF transceiver may have a sufficiently large Hamming distance to map the sets of received power levels to a common spreading sequence that may be orthogonal with respect to a spreading sequence created by another RF transceiver at an earlier or later time. As described below, the ECC used by these embodiments depends on the type of spreading sequence to be created and on the bandwidth of the RF channel 230.

For spreading sequence creation using the embodiment shown in FIG. 2, the RF transceivers 210 and 250 may be concurrently placed in a spreading sequence creation mode. This may be accomplished, for example, using a communication between the two devices that is either spread according to a default spreading sequence or that is not spread. In an example spreading sequence creation mode, each RF transceiver 210 and 250 may be allocated a predetermined amount of time to receive a signal (e.g., null packets) to be used to create the spreading sequence.

The RF transceiver 250 creates its spreading sequence before, during or after the creation of the spreading sequence by the RF transceiver 210. The creation of the spreading sequence by the RF transceiver 250 is similar to the creation by the RF transceiver 210 which is described briefly below. At a time agreed between RF transceivers 210 and 250, the RF transceiver 250 sends a predetermined packet or set of packets through the RF channel 230. The RF circuitry 212 or a combination of the RF circuitry 212 and the baseband processing circuitry 220 measures the received power of each packet and provides the power measurements to the processor 214. The processor 214 converts the power measurements derived from the received packets to a set of symbols that is stored in the memory 216. The processor 214 then processes the stored power measurements to create the spreading sequence as described below with reference to FIGS. 5A and 5B.

After both of the RF transceivers 210 and 250 have created their spreading sequence, RF transceiver 210 may spread a predetermined data stream and send it to the RF transceiver 250. If RF transceiver 250 can despread and detect the known data stream using its spreading sequence, RF transceiver 250 may send an acknowledgement signal to the RF transceiver 210 indicating that both spreading sequences match. Alternatively, each RF transceiver may spread and send the known data to the other RF transceiver and, upon successful demodulation and despreading, store and begin to use the created spreading sequence without sending an acknowledgement signal. If RF transceiver 250 cannot despread the data stream then the two spreading sequences do not match and both RF transceivers 210 and 250 restart the process of creating their respective spreading sequences.

Figure 4A:
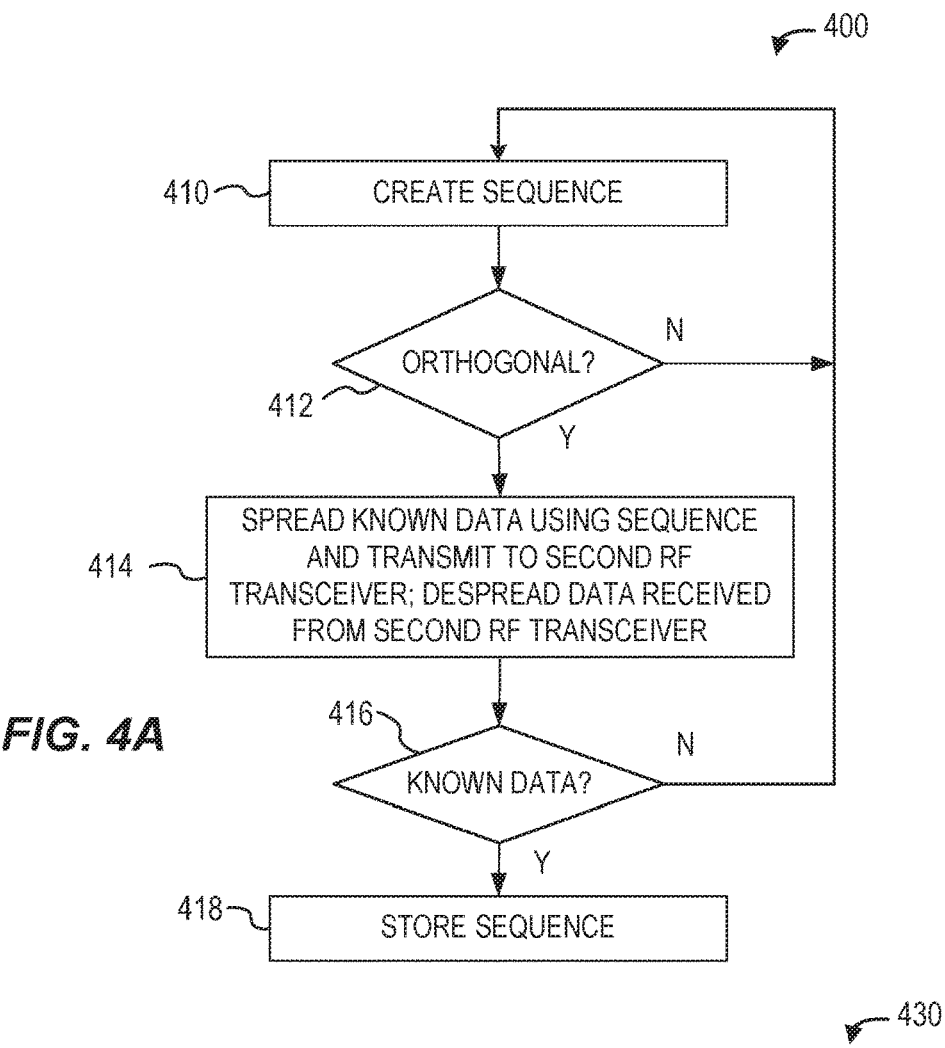
FIGS. 4A and 4B are flow-chart diagrams showing example functions performed by the RF transceivers shown in FIG. 2.

As described above, because the two RF transceivers 210 and 250 create their spreading sequences independently, the spreading sequences may or may not match. FIG. 4A is a flowchart diagram an example spreading sequence creation process 400 implemented by the RF transceivers 210 and 250, according to example embodiments, to achieve matched spreading sequences. FIG. 4A is described in the context of RF transceiver 210. The same operations, however, apply to RF transceiver 250.

At block 410, the RF transceiver 210 creates the spreading sequence. Example processes for creating the spreading sequence are described below with reference to FIGS. 4B, 5A, and 5B. As described below, one component of creating the spreading sequence is testing the spreading sequence to determine if it is sufficiently orthogonal to known spreading sequences currently being used. Thus, in the described embodiments, block 410 returns both the created spreading sequence and an indication (e.g., a Boolean value) of whether the created spreading sequence is sufficiently orthogonal. At block 412 the processor 214 tests the orthogonality indication returned by block 410. When block 412 determines that the spreading sequence created in block 410 is not sufficiently orthogonal, process 400 branches to block 410 to create a new spreading sequence.

When block 412 determines that the created spreading sequence is sufficiently orthogonal to the other known spreading sequences, the RF transceiver 210, as described above, spreads a known data set using the created spreading sequence and transmits the spread data set to the RF transceiver 250 over the RF channel 230. The RF transceiver 250 receives, and dispreads the RF signal. The process 400 may also receive the known data set spread by the spreading sequence created by RF transceiver 250. When the RF transceiver 210 successfully despreads the data set, as indicated by block 416, the processor 214 may store the spreading sequence in the memory 216 and, optionally, send an acknowledgement signal to the RF transceiver 250.

When the RF transceiver 210 does not obtain the known data set at block 416 then, either the RF transceiver 250 created a different spreading sequence or the created spreading sequence is not sufficiently orthogonal to an unknown spreading sequence that is currently being used by another RF transceiver pair. In this instance, the process 400 transfers control to block 410 to create a new spreading sequence.

Figure 4B:
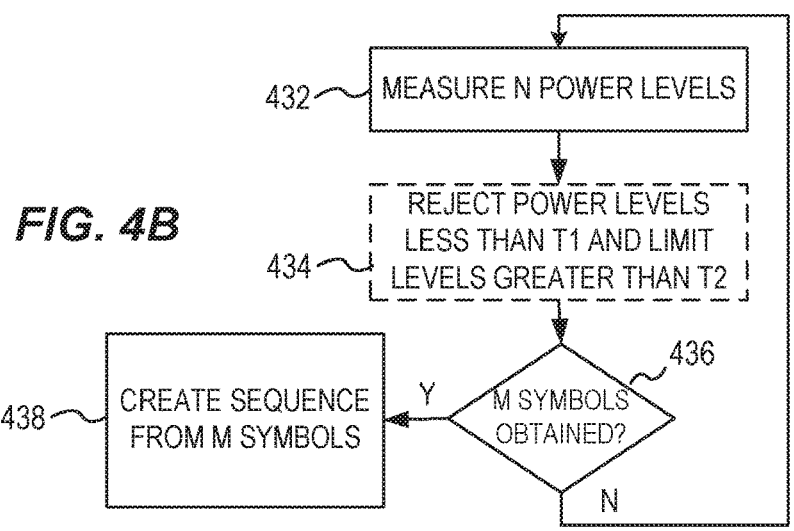
Figure 5A:
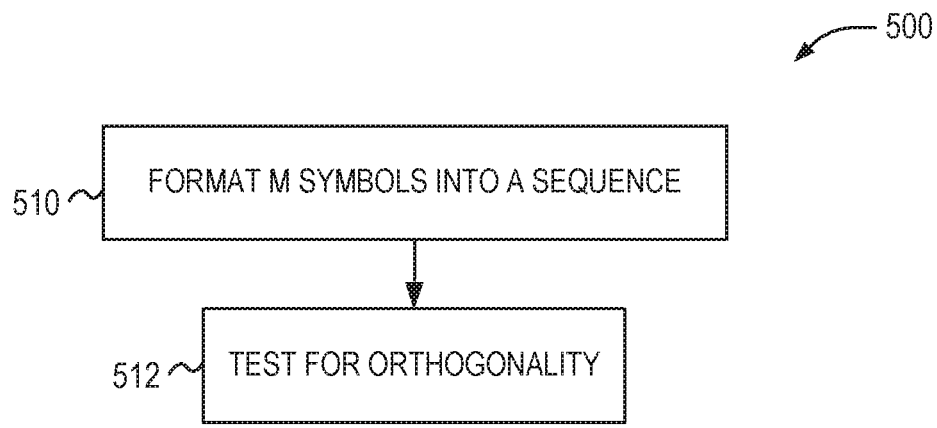
FIGS. 5A and 5B are flow-chart diagrams showing example methods for generating a spreading sequence from a set of symbols.
Figure 5B:
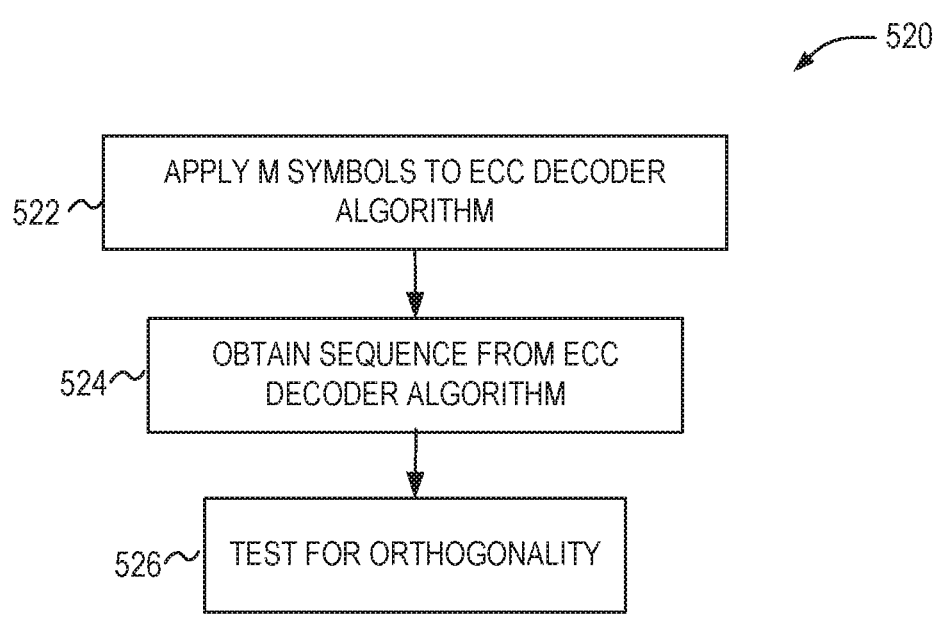

FIGS. 4B, 5A and 5B are flowchart diagrams that describe examples of a process 430 that may be used in an embodiment of block 410 for creating the spreading sequence. FIG. 4B shows the overall process 430 while FIGS. 5A and 5B show example spreading sequence creation processes that may be used as a part of the process 430. At block 432 of FIG. 4B, the processor 214 of the RF transceiver 210 measures power levels of N packets received from the RF transceiver 250. As described above, the power measurement may be a RSSI, RCPI or other power level measurement indicating received power of signals from the RF transceiver 250. At block 434, the process 430 optionally rejects any power level values that are greater than a threshold T1 and/or less than a threshold T2. As an alternative to using the thresholds, example embodiments may select only certain bits of each measurement as a symbol to use to create the spreading sequence. As described above, depending on the type of spreading sequence being created, block 434 may retain or delete zero-valued power level values.

For some spreading sequences, for example those used in a DSSS system in which the spreading sequence is created by concatenating multiple symbols to form a binary string, it may not be desirable to have strings of zero-valued bits occurring at regular intervals in the spreading sequence. For example, when the received power levels are relatively low the power level measurements may be in a range from 0 to 2 V but may be quantized by the RF circuitry in a range from 0 to 16 V. In this embodiment, block 434 may delete the three most significant bits (MSBs) and the three least significant bits (LSBs) to provide 10 bit symbol values. At higher power levels, for example when the received power level values span the full range from 0 to 16 V, block 434 may delete the six LSBs of each power level value to still produce 10-bit symbols. The threshold T1 may also be set to achieve a certain ratio of zero-valued symbols to non-zero-valued symbols, for example for a THS spreading sequence. At block 436, the process 430 determines whether at least M symbols have been obtained. If they have not, process 430 transfers control to block 432 to obtain N more power level values. When at least M symbols have been obtained at block 436, block 438 creates the spreading sequence from the M symbols.

The N power level values measured in block 432 of FIG. 4B may be measured by the RF transceiver 210 in a group or concurrently with the N power level measurements made by the RF transceiver 250. In one embodiment, during block 432, each transceiver 210 and 250 may transmit N predetermined packets (e.g., null packets) to the other transceiver. These packets may be transmitted sequentially or they may be interleaved such that each transceiver 210 and 250 transmits one or more packets in a frame time until each transceiver has transmitted and received N packets. As described above, it may be desirable to interleave the packet transmissions so that the packets received by both RF transceivers are subject to similar channel conditions.

Furthermore, the RF transceiver 210 and 250 may transmit and receive packets in different frequency bands during the creation of the spreading sequences. For example, each RF transceiver in a FHSS system may, during sequence creation, hop among predetermined hopping frequencies according to a predetermined hopping sequence. The hopping among the hopping frequencies may be synchronized by the time synchronization circuitry 218 according to a predetermined protocol to be used during creation of the spreading sequence. The protocol may, for example, specify when each RF transceiver 210 and 250 transmits or receives signals used to determine the power level measurements, when each transceiver creates the spreading sequence, and when each transceiver transmits and receives a known data set spread with the created spreading sequence.

The numbers N and M depend on the desired size of the spreading sequence which, in turn, depends on the type of spreading being performed and, for frequency spreading systems, on the available bandwidth. For example, to create a 1024 bit spreading sequence for a DSSS system the process 430 may need to generate 103 10-bit symbols from the power level measurements. In the example shown in FIG. 4B, N may have a value of 10 or more and M may have a value of 110 so that at least 11 iterations through the loop of the process 430 produce the desired number of symbols. In another embodiment, the symbol size may be 10 bits, N may be 1 and M may be 13, for example, to create a 128 bit spreading sequence that may be used, for example, in a THS system, an FHSS system, or a DSSS system having a limited spreading bandwidth.

FIG. 5A is a flow-chart diagram of an example process 500 that may be used in an embodiment of block 438. The process 500 includes two blocks, block 510 creates the spreading sequence and block 512 tests the created spreading sequence for orthogonality. Block 510 directly uses the M symbols created by the process 430 to create the spreading sequence. For example, for a 2048-bit spreading sequence used in a wide-band DSSS system, block 510 may concatenate 205 ten-bit symbols. In another example, for a narrow-band DSSS system, the spreading sequence may be less than 10 symbols. A spreading sequence for an OFDM spread spectrum sequence may employ a string of symbols, where each symbol represents a constellation of subcarriers used in a corresponding time slot corresponding to the position of the symbol in the string.

In block 512 of process 500, the processor 214 determines whether the created spreading sequence is sufficiently orthogonal to other spreading sequences that the processor 214 knows to be currently used by the RF transceiver 210 or by other pairs of RF transceivers 210 and 250. The processor 210 may, for example, maintain or have access to a table of spreading sequences known to be currently in use. The processor 210 may compare the spreading sequence created in block 410 to each of these stored spreading sequences and determine an amount of overlap. Because the data exchanged by the two RF transceivers may be fault-tolerant (e.g., transmitted according to a guaranteed transmission protocol such as TCP and/or employing forward error correction (FEC) coding), the system may tolerate some level of overlap between the created spreading sequence and one or more of the stored spreading sequences. Block 512 returns the created spreading sequence and an indication (e.g., a Boolean value) indicating whether the created spreading sequence is sufficiently orthogonal to the known spreading sequences.

FIG. 5B is a flowchart diagram showing an alternative process 520 that uses an ECC decoder to create the spreading sequence. At block 422, the processor 214 concatenates the M symbols generated as described above with reference to FIGS. 4A and 4B and applies the resultant value to the ECC decoder. In example embodiments, the ECC decoder may be a Reed-Solomon decoder implemented in software run by the processors 214 and 254 of the respective RF transceivers 210 and 250. As described above, the ECC decoder may implement a many-to-one mapping in which one of a set of mutually orthogonal spreading sequences is provided responsive to each of several similar concatenated power measurement values. The mapping may project concatenated symbol values onto a spreading sequence where the concatenated symbol values differ from the spreading sequence in, for example, 1, 2, 3, or more bit positions. After obtaining the spreading sequence at block 524, the process 520 tests the created spreading sequence for orthogonality as described above with reference to block 512 of FIG. 5A. Although example embodiments use an ECC decoder, it is contemplated that other many-to-one mapping algorithms, such as a hashing algorithm may be used to generate the spreading sequence.

Figure 6A:
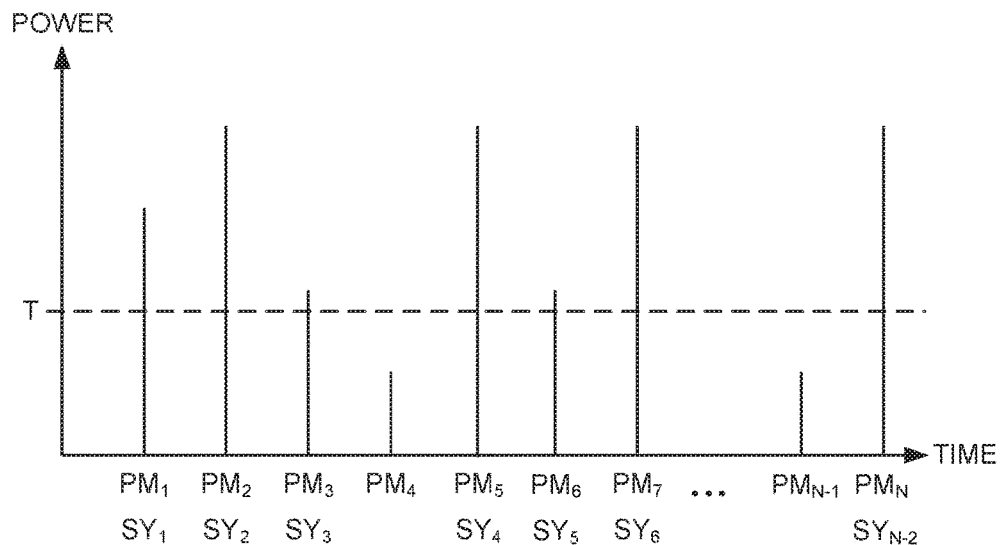
FIG. 6A is a graph of power versus time that is useful for describing example embodiments.
Figure 6B:
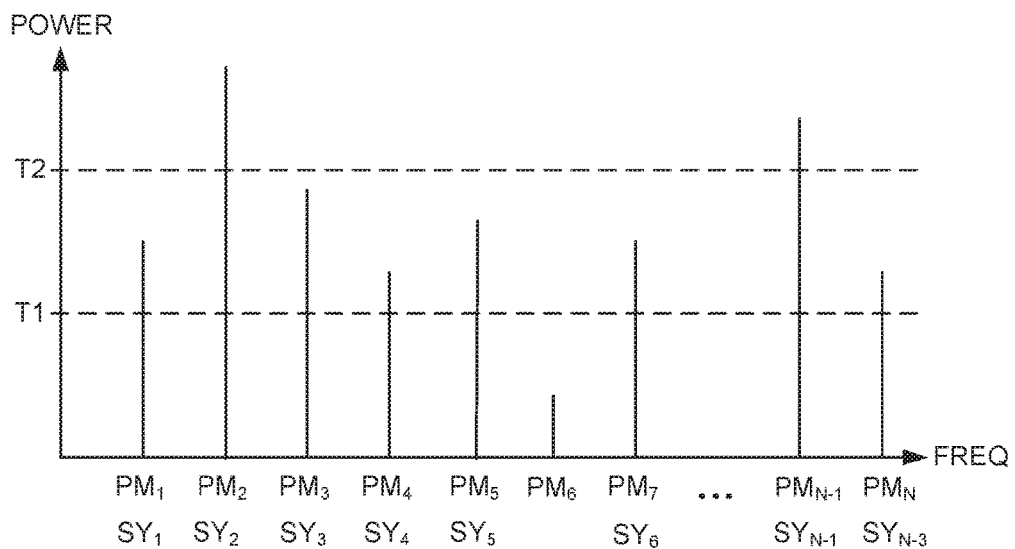
FIG. 6B is a graph of power versus frequency that is useful for describing example embodiments.

FIGS. 6A and 6B are graphs of signal power versus time showing power measuring operations performed in the example RF transceivers 210 and 250. FIGS. 6A and 6B show example power-level measurements received at transceiver 210 of FIG. 2. $PM_1$, $PM_2$, $PM_3$, $PM_4$, $PM_5$, $PM_6$, $PM_7$, . . . , $PM_{N-1}$, and $PM_N$ are measured power levels generated by RF circuitry 212 from packets received at times that are shown along the horizontal time axis. The labels $SY_1$, $SY_2$, $SY_3$, $SY_4$, $SY_5$, $SY_6$, . . . , and $SY_{N-2}$ below the respective power measurement values $PM_1$, $PM_2$, $PM_3$, $PM_5$, $PM_6$, . . . , and $PM_N$ indicate the respective N−2 symbols generated from the N measured power levels. As described above, in one example, the measured power levels may be 16-bit values while the symbols may be 10-bit values derived from respective ones of the measured power levels.

Each measured power level may be converted to a bit string or retained as a multi-bit digital value that indicates the measured power level according to the height of each line shown by the vertical power axis. As described above, each power level is related to instantaneous channel conditions at the time a particular packet is received by the RF transceiver 210 or 250. The relative heights of the measured power levels is exaggerated in FIGS. 6A and 6B to illustrate operation of the embodiment. Alternatively, the relative heights of the power levels may represent a non-linear transfer function being applied during measurement, for example, after application of an automatic gain control (AGC) function by the RF circuitry. In this instance, the transfer function may assign more quantization levels to higher power levels than to lower power levels, enhancing differences among the measured power levels.

In the scenario shown in FIG. 6A, the processor 214 receives the power level measurements from the RF circuitry 212. The horizontal line T represents a threshold value. As described above, depending on the type of spreading sequence being created, the transceivers 210 and 250 may ignore the power measurements having values less than the threshold T when generating the output symbols used to create the spreading sequence in order to increase the likelihood that both transceivers create the same spreading sequence. As shown in FIG. 6A, power measurements $PM_4$ and $PM_{N-1}$ have values less than the threshold T and are ignored so that the processor 214 of the RF transceiver 210 generates symbols $SY_1$, $SY_2$, $SY_3$, $SY_4$, $SY_5$, $SY_6$, and $SY_{N-2}$, corresponding to the respective power measurements, $PM_1$, $PM_2$, $PM_3$, $PM_5$, $PM_6$, $PM_7$ and $PM_N$. It may be desirable, however, to include zero-valued symbols in some spreading sequences. For these spreading sequences, the symbols are not ignored but converted to zero-valued symbols.

As an alternative to using a threshold T, some embodiments may set some number of the least significant bits (LSBs) of each measured power level to zero, effectively coring the power level values to eliminate low-level variations corresponding to noise. This may be advantageous to increase the likelihood that both RF transceiver 210 and RF transceiver 250 create the same spreading sequence.

The scenario shown in FIG. 6B illustrates an example in which the N power level measurements are made at N different frequencies in a hopping sequence. The use of different frequencies during spreading sequence creation may be advantageous as it may result in greater variability in the RF channel 230 and, thus, allow each of the RF transceiver pairs 210 and 250 to create different spreading sequences, especially when each transceiver pair uses a different default hopping sequence during spreading sequence creation.

FIG. 6B, shows the power level measurements at the different frequencies. Power level measurements $PM_1$, $PM_2$, $PM_3$, $PM_4$, $PM_5$, $PM_6$, $PM_7$, . . . , $PM_{N-1}$, and $PM_N$ represent the N power levels measured at block 432 of FIG. 4B. The example illustrated by FIG. 6B shows two threshold values, a lower threshold T1 and an upper threshold T2. The use of either threshold T1 or T2 is optional. In some embodiments, the difference between the thresholds T1 and T2 may represent an expected range of power levels. Power levels less than T1 may be set to zero or ignored and each symbols may include only the portion of the corresponding power level value between T1 and T2. For example, each power level measurement may be limited to a maximum value of T2 and the system may subtract T1 from each power measurement before generating the corresponding symbol. Alternatively, the I LSBs corresponding to values less than T1 and J MSBs corresponding to values greater than T2 of the each power measurement may be ignored or set to zero during symbol generation, where I and J are integers such that I+J is less than the number of bits in each power level measurement. As shown in FIG. 6B, power measurements $PM_2$ and $PM_{N-1}$ are greater than T2 and power measurements $PM_6$ is less than T1. Accordingly, the symbols derived from $PM_2$ and $PM_2$ have values of T2−T1 and the symbol derived from $PM_6$ has a value of zero. The remaining symbols have values of $PM_x$−T1, where "x" corresponds to the power measurement number. In some embodiments, the threshold T1 may be adjusted to achieve a desired ratio of zero-valued symbols to non-zero-valued symbols.

In embodiments power level measurements having values less than T1 are ignored and no corresponding symbols are generated. Thus, in the scenario shown in FIG. 6B, the processor 214 of the RF transceiver 210 ignores power measurement $PM_6$ and generates N−1 symbols $SY_1$, $SY_2$, $SY_3$, $SY_4$, $SY_5$, . . . , and $SY_{N-1}$ from the N−1 Power measurements $PM_1$, $PM_2$, $PM_3$, $PM_4$, $PM_5$, $PM_7$, . . . , $PM_{N-1}$, and $PM_N$.

Power level measurements, such as the measurements $PM_2$ and $PM_{N-1}$, that exceed the upper threshold T2 may serve another purpose: identifying frequency hopping channels that have excessive interference. While power level measurements made in these frequency channels may be used to create the spreading sequence, the processor 214 may also note the high power level and mark the corresponding frequency band not to be used during frequency hopping.

The example embodiments disclosed herein may be described in the general context of processor-executable code or instructions stored on memory that may comprise one or more computer readable storage media (e.g., tangible non-transitory computer-readable storage media such as memory 216 or 256). As should be readily understood, the terms "computer-readable storage media" or "non-transitory computer-readable media" include the media for storing of data, code and program instructions, such as memory 216, 256, and do not include portions of the media for storing transitory propagated or modulated data communication signals.

Figure 7:
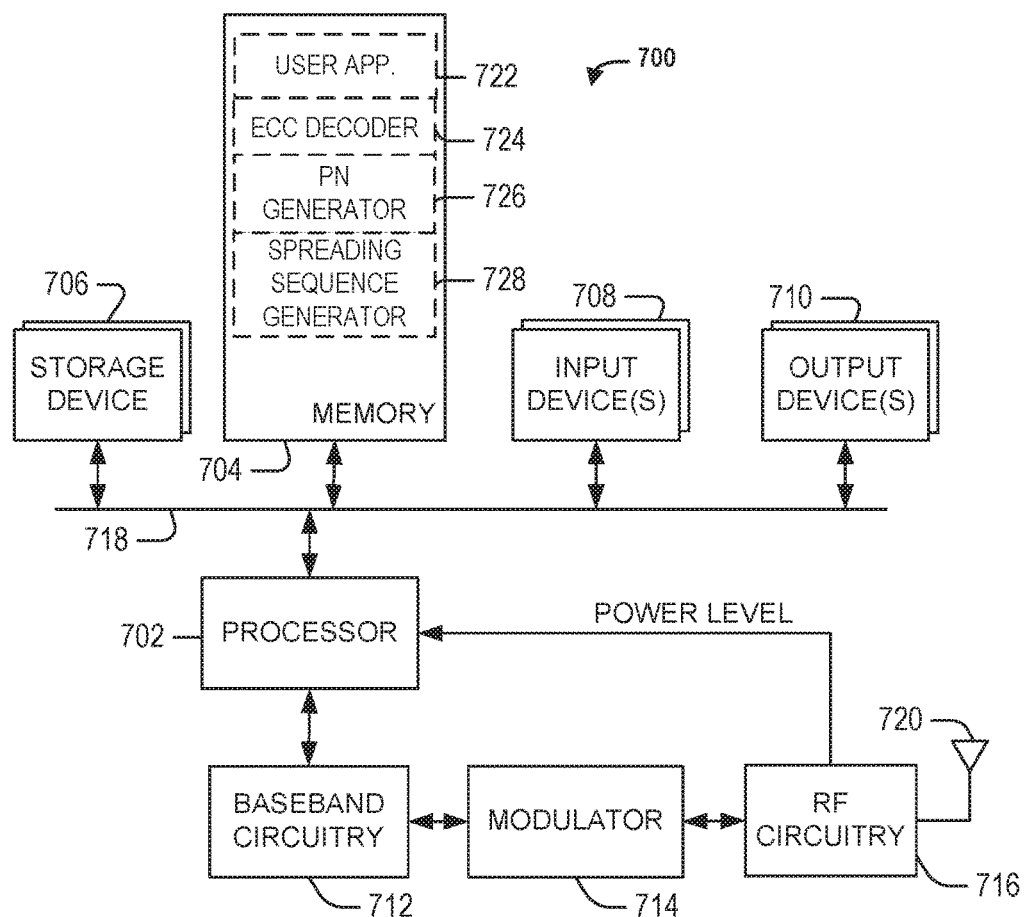
FIG. 7 is a block diagram of example hardware that may be used in an embodiment

FIG. 7 is a block diagram of an example processing system 700 that may be used as the RF transceivers 102 and 104, shown in FIG. 1A, the RF transceivers 152 and 154, shown in FIG. 1B or the RF transceivers 210 and 250, shown in FIG. 2. The system 700 includes a processor 702 coupled to a bus 718. Also coupled to the bus 718 are a memory 704, which may include random access memory (RAM), a read only memory (ROM), and/or a programmable read only memory (PROM); a mass storage device 706, such as a flash memory one or more input devices 708, such as a keypad, touch screen, or a pointing device; and one or more output devices 710, such as a display screen. The processor 702 is coupled to baseband circuitry 712 which, in turn, is coupled to a modulator 714 that is coupled to RF circuitry 716. The RF circuitry 716 is coupled to an antenna 720 to transmit and receive RF signals.

As described above, the RF circuitry may include a carrier frequency generator, an intermediate frequency (IF) amplifier, a mixer, one or more RF amplifiers, an RF transmitter, and an RF receiver, none of which are explicitly shown in FIG. 7. The RF circuitry may also include automatic gain control (AGC) circuitry that adjusts the gain applied to the received signal by the RF amplifier(s). As described above, the control signal for the AGC may be used to generate the power level signal (e.g., RSSI, RCPI) which may be inversely proportional to the AGC signal. The RF circuitry 716 may digitize the power level signal and provide the digitized power level signal directly to the processor 702.

The memory 704 may store computer instructions for applications that are currently running on the system 700 including a user application 722 that generates/receives data from another RF transceiver, an ECC decoder 724, a PN generator 726 (if the pseudorandom numbers are generated in software), and a spreading sequence generator 728. The user application 722 may be, for example, an Internet browser. The memory 704 may also include application program interfaces (APIs), dynamically linked libraries (DLLs), and/or an operating system for the device that includes the RF transceiver. The memory 704 may also store temporary variables, or other information used in the execution of these programs. The programs stored in the memory 704 may be retrieved by the processor from a separate computer readable medium, for example, a flash memory device, a CD-ROM, or digital versatile disk (DVD), which may be a storage device 706. As described above, the power level signal may also be generated by the processor 702, for example, using a wireless network monitoring tool, such as Wireshark, Kismet or Inssider.

Processor 702 may include a microprocessor, microcontroller, digital signal processor (DSP) that is configured to execute commands stored in the memory 704 corresponding to the programs. As shown in FIG. 7, the processor 702 may provide the data to be transmitted and the spreading sequence to the baseband circuitry 712. The baseband circuitry may use the spreading sequence to spread the data and provide the spread data to the modulator which may modulate an IF carrier which is provided to the RF circuitry 716.

Examples

Example 1 is an apparatus for determining a spreading sequence to be used by a first radio-frequency (RF) transceiver for spreading RF signals for transmission by the first RF transceiver, the apparatus comprising: time synchronization circuitry configured to synchronize the first RF transceiver to a second RF transceiver; processing circuitry; a memory, coupled to the processing circuitry, the memory including instructions that configure the processing circuitry to: receive, responsive to the time synchronization circuitry, at least one RF signal from the second RF transceiver; measure a plurality of power levels of the at least one RF signal at a respective plurality of first instants during the reception of the at least one RF signal, responsive to the time synchronization circuitry; create a spreading sequence responsive to the plurality of power levels; and process data to be transmitted by the first RF transceiver using the spreading sequence to spread the data for transmission to the second RF transceiver.

In Example 2, the subject matter of Example 1 includes, wherein the instructions that configure the processing circuitry to measure the plurality of power levels comprises instructions that cause the processing circuitry to measure at least one of a received signal strength indication (RSSI) value or a received channel power indication (RCPI) value of the at least one RF signal at each of the plurality of first instants.

In Example 3, the subject matter of Examples 1-2 includes, wherein the instructions that configure the processing circuitry to create the spreading sequence comprise instructions that cause the processing circuitry to: process the plurality of power levels to delete power levels having values less than a threshold to provide a set of remaining power levels; generate a combined value from the set of remaining power levels; and determine the spreading sequence responsive to the combined value.

In Example 4, the subject matter of Example 3 includes, wherein the instructions that configure the processing circuitry to create the spreading sequence comprise instructions that cause the processing circuitry to: process the plurality of remaining power levels to delete a predetermined number of most significant bits (MSBs) from each remaining power level.

In Example 5, the subject matter of Examples 3-4 includes, wherein the instructions that configure the processing circuitry to determine the spreading sequence comprise instructions that cause the processing circuitry to apply the combined value to a pseudo-random number (PN) generator to generate consecutive PN values as the spreading sequence.

In Example 6, the subject matter of Examples 3-5 includes, wherein the instructions that configure the processing circuitry to determine the spreading sequence configure the processing circuitry to apply the single value as an input value to many-to-one mapping algorithm to determine the spreading sequence as an output value of the many-to-one mapping algorithm.

In Example 7, the subject matter of Example 6 includes, wherein many-to-one mapping algorithm includes an error correction code (ECC) decoder.

In Example 8, the subject matter of Examples 1-7 includes, wherein: the instructions that configure the processing circuitry to receive at least one RF signal from the second RF transceiver configure the processing circuitry to receive a plurality of RF signals from the second RF transceiver, each received RF signal corresponding to a respective one of the first instants; and the instructions further configure the processing circuitry to transmit a plurality of transmitted RF signals to the second RF transceiver at times corresponding to second instants, wherein the second instants are interleaved with the first instants.

In Example 9, the subject matter of Examples 1-8 includes, wherein: the instructions that configure the processing circuitry to create the spreading sequence include instructions that configure the processor to create the spreading sequence for one of a frequency hopping spread spectrum (FHSS) transmission, a direct sequence spread spectrum (DSSS) transmission, a time hopping spreading transmission, and a orthogonal frequency division multiplex (OFDM) spread spectrum transmission.

Example 10 is a method for determining a spreading sequence to be used by a first radio-frequency (RF) transceiver for spreading RF signals comprising: synchronizing the first RF transceiver to a second RF transceiver; receiving at least one RF signal from the second RF transceiver; measuring a plurality of power levels of the at least one RF signal at a respective plurality of first instants during the reception of the at least one RF signal; creating a spreading sequence responsive to the plurality of power levels; and spreading data to be transmitted by the first RF transceiver using the spreading sequence.

In Example 11, the subject matter of Example 10 includes, wherein measuring the plurality of power levels comprises measuring at least one of a respective received signal strength indication (RSSI) value or a respective receive channel power indication (RCPI) of the at least one RF signal at each of the plurality of first instants.

In Example 12, the subject matter of Examples 10-11 includes, wherein creating the spreading sequence comprises: processing the plurality of power levels to delete power levels having values less than a threshold to provide a set of remaining power levels; generating a combined value from the plurality of power levels; and determining the spreading sequence responsive to the combined value.

In Example 13, the subject matter of Example 12 includes, wherein determining the spreading sequence comprises applying the combined value to a pseudorandom number (PN) generator to generate consecutive PN values as the spreading sequence.

In Example 14, the subject matter of Examples 12-13 includes, wherein determining the spreading sequence comprises applying the single value as an input value to an error correction code (ECC) decoder to determine the spreading sequence as an output value of the ECC decoder.

In Example 15, the subject matter of Examples 10-14 includes, wherein: receiving the at least one RF signal from the second RF transceiver includes receiving a plurality of RF signals, each received signal corresponding to a respective one of the first instants; and the method comprises transmitting a plurality of transmitted RF signals to the second RF transceiver corresponding to second instants, wherein the second instants are interleaved with the first instants.

Example 16 is an apparatus for determining a spreading sequence to be used by a first radio-frequency (RF) transceiver for spreading RF signals, the apparatus comprising: means for synchronizing the first RF transceiver to a second RF transceiver; means for receiving at least one RF signal from the second RF transceiver; means for determining a plurality of power levels of the at least one RF signal at a respective plurality of first instants during the reception of the at least one RF signal; means for creating a spreading sequence responsive to the plurality of power levels; and means for spreading data to be transmitted by the first RF transceiver using the spreading sequence.

In Example 17, the subject matter of Example 16 includes, wherein the means for determining the plurality of power levels comprises means for measuring at least one of a respective received signal strength indication (RSSI) value or a respective receive channel power indication (RCPI) of the at least one RF signal at each of the plurality of first instants.

In Example 18, the subject matter of Examples 16-17 includes, wherein the means creating the spreading sequence comprises: means for processing the plurality of power levels to delete power levels having values less than a threshold to provide a set of remaining power levels; means for generating a combined value from the plurality of power levels; and means for determining the spreading sequence responsive to the combined value.

In Example 19, the subject matter of Example 18 includes, wherein the means for determining the spreading sequence comprises means for generating consecutive pseudorandom number (PN) values from the combined value wherein the spreading sequence includes the consecutive PN values.

In Example 20, the subject matter of Examples 18-19 includes, wherein the means for determining the spreading sequence comprises means for performing a many-to-one mapping on the combined value, wherein the spreading sequence includes an output value provided by the many-to-one mapping.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications, and variations that fall within the scope of the appended claims.

In particular and in regard to the various functions performed by the above described components, devices, circuits, systems and the like, the terms used to describe such components are intended to correspond, unless otherwise indicated, to any component which performs the specified function of the described component, e.g., a functional equivalent, even though not structurally equivalent to the disclosed structure, which performs the function in the example illustrated aspects of the claimed subject matter. In this regard, it will also be recognized that the disclosed example embodiments and implementations include a system as well as computer-readable storage media having computer-executable instructions for performing the acts and events of the various methods of the claimed subject matter.

There are multiple ways of implementing the claimed subject matter, e.g., an appropriate API, tool kit, driver code, operating system, control, standalone or downloadable software object, etc., which enables applications and services to use the techniques described herein. The claimed subject matter contemplates the use from the standpoint of an API (or other software object), as well as from a software or hardware object that operates according to the techniques set forth herein. Thus, various implementations of the claimed subject matter described herein may have aspects that are wholly in hardware, partly in hardware and partly in software, as well as in software.

The aforementioned example systems have been described with respect to interaction among several components. It can be appreciated that such systems and components can include those components or specified sub-components, some of the specified components or sub-components, and additional components, and according to various permutations and combinations of the foregoing. Sub-components can also be implemented as components communicatively coupled to other components rather than included within parent components (hierarchical).

Additionally, it is noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

Furthermore, while a particular feature of the claimed subject matter may have been disclosed with respect to one of several implementations, such feature may be combined with one or more other features of the other implementations as may be desired and advantageous for any given or particular application. In addition, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. An apparatus for determining a spreading sequence to be used by a first radio-frequency (RF) transceiver for spreading RF signals for transmission by the first RF transceiver, the apparatus comprising:
   time synchronization circuitry configured to synchronize the first RF transceiver to a second RF transceiver;
   processing circuitry;
   a memory, coupled to the processing circuitry, the memory including instructions that configure the processing circuitry to:
   receive at least one RF signal from the second RF transceiver during an interval starting at a time determined by the time synchronization circuitry;
   measure a plurality of power levels of the at least one RF signal at a respective plurality of first instants during the reception of the at least one RF signal, responsive to the time synchronization circuitry, wherein variations in the measured power levels represent respective variations in an RF channel between the first and second RF transceivers;

create a spreading sequence from the plurality of measured power levels; and process data to be transmitted by the first RF transceiver using the spreading sequence to spread the data for transmission to the second RF transceiver.

2. The apparatus of claim 1, wherein the instructions that configure the processing circuitry to measure the plurality of power levels comprises instructions that cause the processing circuitry to measure at least one of a received signal strength indication (RSSI) value or a received channel power indication (RCPI) value of the at least one RF signal at each of the plurality of first instants.

3. The apparatus of claim 1, wherein the instructions that configure the processing circuitry to create the spreading sequence comprise instructions that cause the processing circuitry to:

process the plurality of power levels to delete power levels having values less than a threshold to provide a set of remaining power levels;

generate a combined value from the set of remaining power levels; and determine the spreading sequence responsive to the combined value.

4. The apparatus of claim 3, wherein the instructions that configure the processing circuitry to create the spreading sequence comprise instructions that cause the processing circuitry to:

process the set of remaining power levels to delete a predetermined number of most significant bits (MSBs) from each remaining power level in the set of remaining power levels.

5. The apparatus of claim 3, wherein the instructions that configure the processing circuitry to determine the spreading sequence comprise instructions that cause the processing circuitry to apply the combined value to a pseudo-random number (PN) generator to generate consecutive PN values as the spreading sequence.

6. The apparatus of claim 3, wherein the instructions that configure the processing circuitry to determine the spreading sequence configure the processing circuitry to apply the combined value as an input value to many-to-one mapping algorithm to determine the spreading sequence as an output value of the many-to-one mapping algorithm.

7. The apparatus of claim 6, wherein the many-to-one mapping algorithm includes an error correction code (ECC) decoder.

8. The apparatus of claim 1, wherein:

the instructions that configure the processing circuitry to receive at least one RF signal from the second RF transceiver configure the processing circuitry to receive a plurality of RF signals from the second RF transceiver, each received RF signal corresponding to a respective one of the first instants; and the instructions further configure the processing circuitry to transmit a plurality of transmitted RF signals to the second RF transceiver at times corresponding to second instants, wherein the second instants are interleaved with the first instants.

9. The apparatus of claim 1, wherein:

the instructions that configure the processing circuitry to create the spreading sequence include instructions that configure the processing circuitry to create the spreading sequence for one of a frequency hopping spread spectrum (FHSS) transmission, a direct sequence spread spectrum (DSSS) transmission, a time hopping spreading (THS) transmission, and an orthogonal frequency division multiplex (OFDM) spread spectrum transmission.

10. A method for determining a spreading sequence to be used by a first radio-frequency (RF) transceiver for spreading RF signals comprising:

synchronizing the first RF transceiver to a second RF transceiver;

receiving at least one RF signal from the second RF transceiver;

measuring a plurality of power levels of the at least one RF signal at a respective plurality of first instants during the reception of the at least one RF signal, wherein variations in the measured power levels represent respective variations in an RF channel between the first and second RF transceivers;

creating a spreading sequence from the plurality of power levels; and spreading data to be transmitted by the first RF transceiver using the spreading sequence.

11. The method of claim 10, wherein measuring the plurality of power levels comprises measuring at least one of a respective received signal strength indication (RSSI) value or a respective receive channel power indication (RCPI) of the at least one RF signal at each of the plurality of first instants.

12. The method of claim 10, wherein creating the spreading sequence comprises:

processing the plurality of power levels to delete power levels having values less than a threshold to provide a set of remaining power levels;

generating a combined value from the set of remaining power levels; and determining the spreading sequence responsive to the combined value.

13. The method of claim 12, wherein determining the spreading sequence comprises applying the combined value to a pseudorandom number (PN) generator to generate consecutive PN values as the spreading sequence.

14. The method of claim 12, wherein determining the spreading sequence comprises applying the combined value as an input value to an error correction code (ECC) decoder to determine the spreading sequence as an output value of the ECC decoder.

15. The method of claim 10, wherein:

receiving the at least one RF signal from the second RF transceiver includes receiving a plurality of RF signals, each received signal corresponding to a respective one of the first instants; and the method comprises transmitting a plurality of transmitted RF signals to the second RF transceiver corresponding to second instants, wherein the second instants are interleaved with the first instants.

16. An apparatus for determining a spreading sequence to be used by a first radio-frequency (RF) transceiver for spreading RF signals, the apparatus comprising:

means for synchronizing the first RF transceiver to a second RF transceiver;

means for receiving at least one RF signal from the second RF transceiver;

means for measuring a plurality of power levels of the at least one RF signal at a respective plurality of first instants during the reception of the at least one RF signal, wherein variations in the measured power levels represent respective variations in a channel between the first and second RF transceivers;

means for creating a spreading sequence from the plurality of power levels; and means for spreading data to be transmitted by the first RF transceiver using the spreading sequence.

17. The apparatus of claim 16, wherein the means for determining the plurality of power levels comprises means for measuring at least one of a respective received signal strength indication (RSSI) value or a respective receive channel power indication (RCPI) of the at least one RF signal at each of the plurality of first instants.

18. The apparatus of claim 16, wherein the means creating the spreading sequence comprises:

means for processing the plurality of power levels to delete power levels having values less than a threshold to provide a set of remaining power levels;

means for generating a combined value from the set of remaining power levels; and means for determining the spreading sequence responsive to the combined value.

19. The apparatus of claim 18, wherein the means for determining the spreading sequence comprises means for generating consecutive pseudorandom number (PN) values from the combined value wherein the spreading sequence includes the consecutive PN values.

20. The apparatus of claim 18, wherein the means for determining the spreading sequence comprises means for performing a many-to-one mapping on the combined value, wherein the spreading sequence includes an output value provided by the many-to-one mapping.

\* \* \* \* \*